(12) United States Patent
Guy

(10) Patent No.: US 7,270,506 B2
(45) Date of Patent: Sep. 18, 2007

(54) TOOL ASSEMBLY

(75) Inventor: Hanoch Guy, Petach Tikva (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 11/462,489

(22) Filed: Aug. 4, 2006

(65) Prior Publication Data

US 2007/0031205 A1    Feb. 8, 2007

(30) Foreign Application Priority Data

Aug. 4, 2005    (IL) .................................. 170101

(51) Int. Cl.
 *B23C 5/00* (2006.01)
(52) U.S. Cl. ............... 409/234; 409/232; 408/153; 408/156; 279/56; 82/160
(58) Field of Classification Search ............... 409/234, 409/232, 233, 230, 231, 136, 135; 407/34, 407/40, 46, 48; 408/231, 233, 238, 240, 408/239 A, 239 R, 713, 83.5, 57, 59, 79, 408/80, 81, 82, 223, 224, 225; 82/159, 160; 279/8, 20, 52, 53, 54, 55, 56, 59
See application file for complete search history.

(56) References Cited

U.S. PATENT DOCUMENTS

| | | | | |
|---|---|---|---|---|
| 4,668,138 A | * | 5/1987 | Carter | 409/234 |
| 4,865,336 A | * | 9/1989 | Keritsis | 409/234 |
| 5,167,478 A | * | 12/1992 | Ramunas | 409/234 |
| 5,460,388 A | * | 10/1995 | Lewis et al. | 409/234 |
| 5,716,173 A | * | 2/1998 | Matsumoto | 409/234 |
| 6,053,670 A | | 4/2000 | Schmid | |
| 6,105,974 A | * | 8/2000 | Matsumoto | 409/234 |
| 6,109,152 A | * | 8/2000 | Hecht | 409/234 |
| 6,224,303 B1 | * | 5/2001 | Wheeler et al. | 409/234 |
| 6,244,780 B1 | * | 6/2001 | Hansson | 409/234 |
| 6,270,086 B1 | * | 8/2001 | Lloyd | 409/234 |
| 6,276,879 B1 | * | 8/2001 | Hecht | 409/234 |
| 6,343,901 B2 | * | 2/2002 | Wheeler et al. | 409/234 |
| 6,352,395 B1 | * | 3/2002 | Matsumoto et al. | 409/234 |
| 6,371,705 B1 | * | 4/2002 | Gaudreau | 409/234 |
| 6,409,439 B1 | * | 6/2002 | Riviere | 409/234 |
| 6,517,299 B1 | * | 2/2003 | Lin | 409/234 |
| 6,722,826 B2 | * | 4/2004 | Cavanaugh | 409/234 |
| 6,905,278 B2 | * | 6/2005 | Kress et al. | 409/234 |
| 2004/0261241 A1 | * | 12/2004 | Crouch | 409/234 |
| 2005/0089382 A1 | * | 4/2005 | Stojanovski | 409/234 |

FOREIGN PATENT DOCUMENTS

DE    1017882    10/1957
FR    1532573    7/1968

OTHER PUBLICATIONS

International Search Report, PCT/IL2006,000969, dated Dec. 12, 2006.

* cited by examiner

*Primary Examiner*—Dana Ross
(74) *Attorney, Agent, or Firm*—Womble Carlyle

(57) ABSTRACT

A tool assembly in which a tool is removably secured to a tool holder. A sleeve of the tool is first fitted onto a shaft of the tool holder and then, by symmetrically radially expanding the shaft, the tool is secured to the tool holder.

14 Claims, 5 Drawing Sheets

TOOL ASSEMBLY

FIELD OF THE INVENTION

The present invention relates to a tool assembly comprising a tool holder and a cutting tool for metal cutting operations, the tool assembly being of the type wherein a sleeve of the tool fits on a shaft of the tool holder and is mechanically affixed thereto.

BACKGROUND OF THE INVENTION

In such tool assemblies a clearance is provided between the sleeve of the tool and the shaft of the tool holder so that the tool can slide onto the shaft before being finally secured to it. Many methods of mechanically securing the tool to the tool holder result in non-symmetrical securing, thereby giving rise to mis-alignment of the cutting tool relative to the tool holder causing radial runout. As is well known, runout decreases the precision and increases the wear of the cutting tool, and reduces the surface quality of the workpiece.

It is an object of the present invention to provide a tool assembly that significantly reduces or overcomes the aforementioned disadvantages.

The objects of the invention are attained with the subject matter in accordance with the respective claims.

SUMMARY OF THE INVENTION

In one aspect, the present invention is directed to a tool assembly comprising a tool holder having a holder axis, and a cutting tool.

The tool holder comprises a holder body and a sliding device. The holder body comprising a shaft at a forward end thereof and a holder cavity, the shaft having a peripheral shaft face coaxial with the holder axis, the holder cavity having a holder wall coaxial with the holder axis, at least one section of the holder wall comprising a first forwardly tapering surface. The sliding device has a forward end and a rear end, and at least one peripheral section of the sliding device comprises a second forwardly tapering surface. The cutting tool has a tool axis defining a front to back direction and comprises a tool cavity having a tool wall coaxial with the tool axis. The tool assembly is adjustable between an unassembled position in which the tool holder and cutting tool are separated from one another; and a locked position. In the locked position, the cutting tool is removably secured to a forward end of the tool holder; the sliding device is releasably retained in the holder body with the first forwardly tapering surface abutting the second forwardly facing surface; and at least a portion of the shaft face abuts at least a portion of the tool wall.

The sliding device may comprise a flange and a bushing; the second forwardly tapering surface is associated with the flange; and the bushing is provided with an internal thread.

The holder cavity may open out to a forward end of the shaft via an aperture having an aperture diameter Da; the flange may has a maximum diameter dL, with dL>Da. In the locked position, the flange is retained in the holder cavity with the first forwardly tapering surface of the holder wall being in abutment with the second forwardly tapering surface of the flange.

The flange and the bushing may be separate members. Alternatively the flange and bushing may form an integral one-piece member.

The tool assembly, may further comprise a clamping bolt having a clamping face and a threaded portion extending away from the clamping face. The sliding device may comprise a device cavity having a device wall, at least a portion of the device wall forming an internal thread, while the cutting tool comprises an axially oriented sleeve extending to a frontally facing sleeve face. In the locked position, the device wall is coaxial with the holder axis; the threaded portion of the clamping bolt is threadingly engaged in the internal thread; and the clamping face of the clamping bolt abuts the sleeve face of the cutting tool.

The tool holder may comprise a fastening screw threadingly engaged in the internal thread and the holder cavity may have a rear surface at a rear end thereof. In the locked position, a rear end of the fastening screw abuts the rear surface of the holder cavity.

The device cavity may open out to the forward and rear ends of the sliding device.

The cutting tool may have a backwardly facing tool face and an axially oriented sleeve extending to a frontally facing sleeve face, the sleeve extending in a direction away from the backwardly facing tool face. The tool may have a forwardly facing holder face and the tool holder's shaft extends forwardly and away from the holder face. In the locked position, the backwardly facing tool face at least partially abuts the forwardly facing holder face.

The shaft face and tool wall may each lie on a peripheral surface of a cylinder, while the first and second tapering surfaces may each lie on a peripheral surface of a truncated cone.

The cutting tool may have an axially oriented sleeve extending to a frontally facing sleeve face; the holder cavity may open out to the forward end of the holder body; and the tool cavity may out to the frontally facing sleeve face and a backwardly facing tool face.

The at least a portion of the shaft face may symmetrically abut the at least a portion of the tool wall.

In another aspect, the present invention is directed to a method of assembling a tool assembly of the sort discussed above. Such a method comprises: providing such a tool holder with its holder body and sliding device; providing such a cutting tool having a tool axis defining a front to back direction and comprising a tool cavity having a tool wall coaxial with the tool axis; inserting the shaft of the tool holder into the tool cavity of the tool; and urging the sliding device forwardly so that the first tapering surface bears against the second tapering surface and deforms the shaft face outwardly until at least a portion of the shaft face abuts the tool wall.

The method may also entail turning a clamping bolt having a threaded portion engaged to an internal thread formed in a device wall of the sliding device, to thereby urge the sliding device forwardly.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
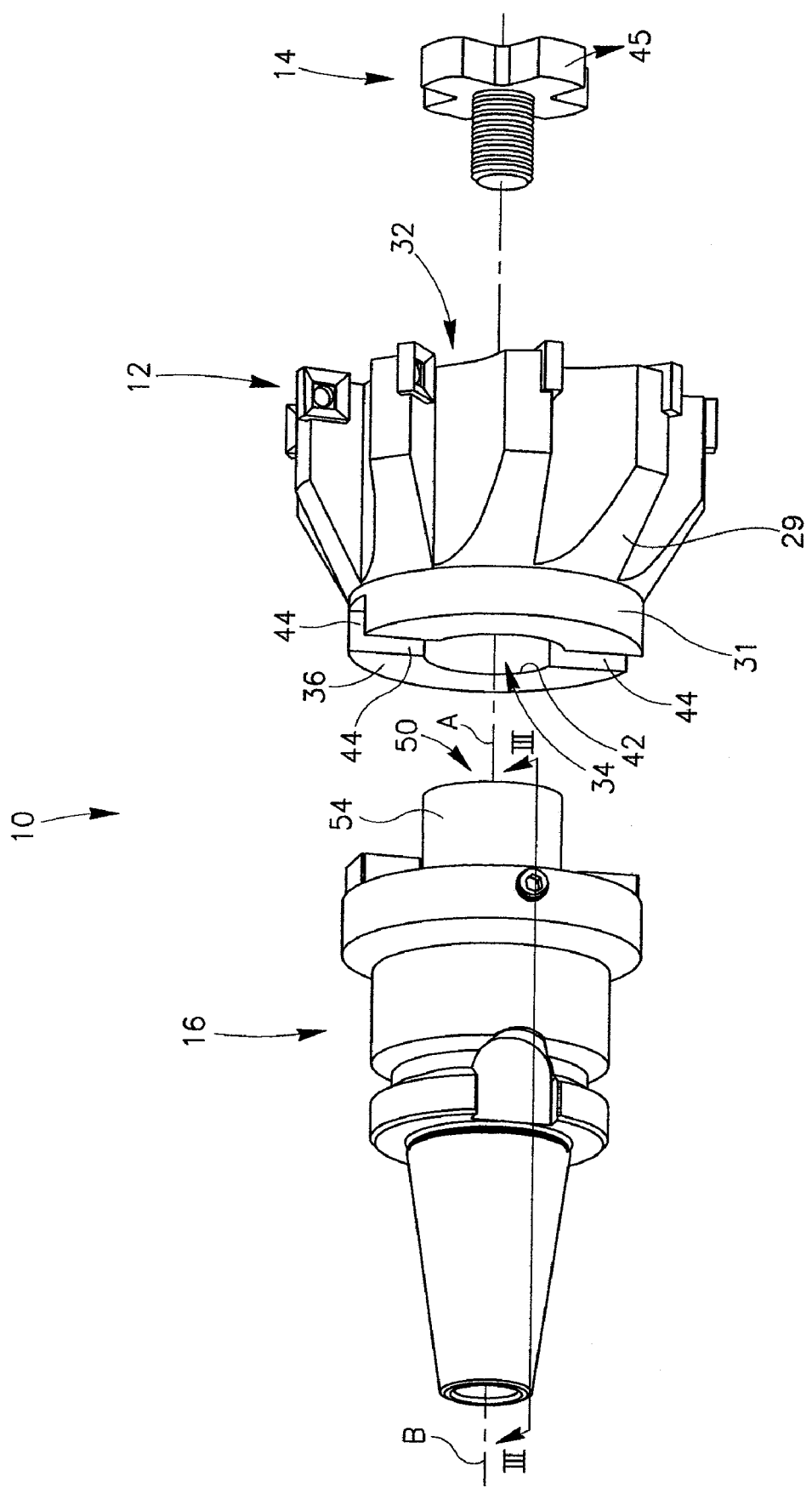
FIG. 1 is a perspective view of a tool assembly showing a tool and a clamping bolt removed from a tool holder.
Figure 2:
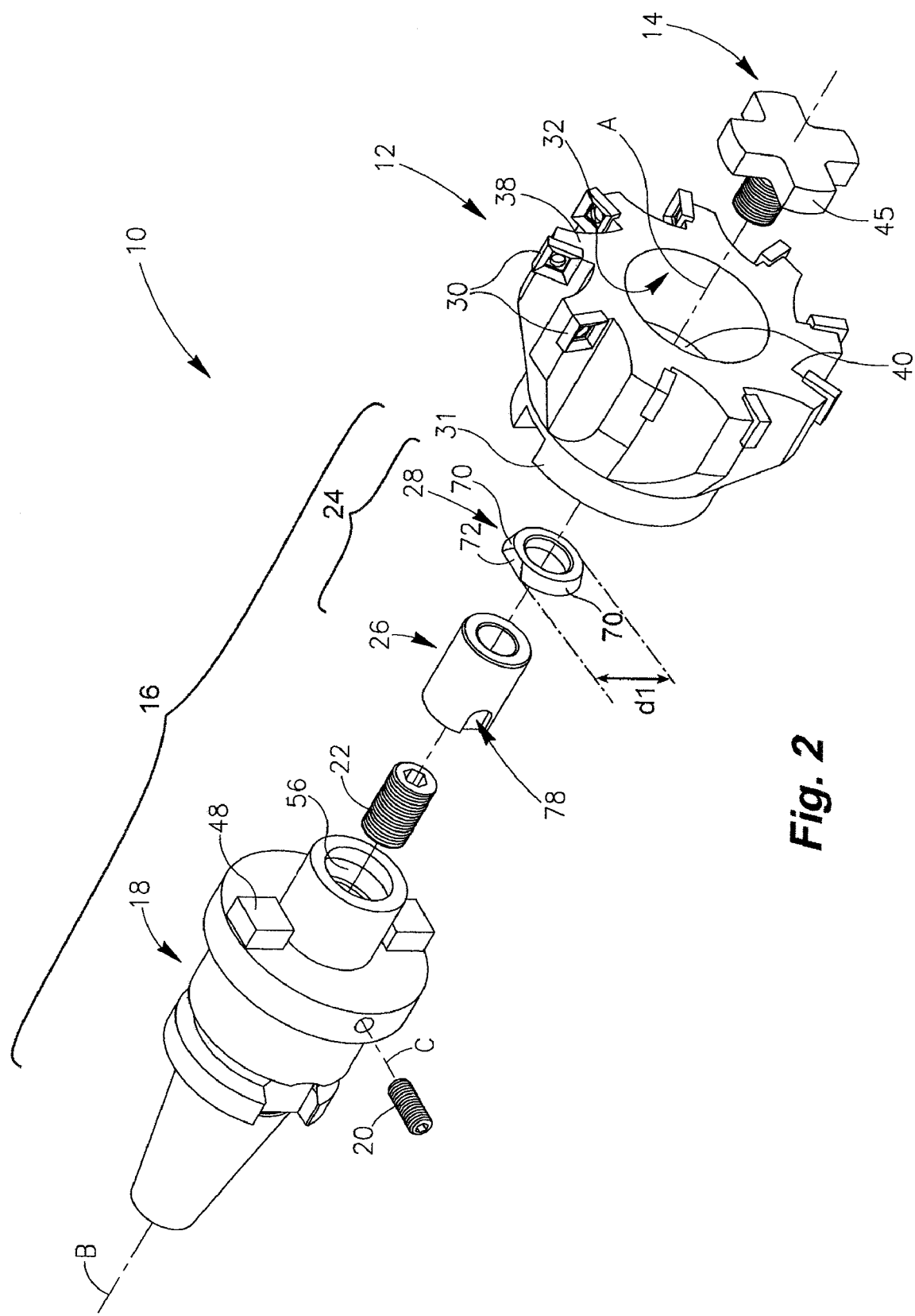
FIG. 2 is an exploded perspective view of the tool assembly shown in FIG. 1, seen with a two-piece embodiment of a sliding device.

Attention is first drawn to FIGS. 1 and 2 showing a tool assembly 10 having a tool 12 and a clamping bolt 14 in a detached position from a tool holder 16. The tool holder 16 has a holder body 18, an anti-rotation screw 20, a fastening screw 22 and a sliding device 24 which consists of a bushing 26 and a flange 28. The holder body 18 receives the anti-rotation screw 20, the fastening screw 22 and the sliding device 24 to form the tool holder 16 for detachably mounting the tool 12.

It should be noted that directional terms appearing throughout the specification and claims, e.g. "forward", "rear", "front", "back" etc., (and derivatives thereof) are used as terms of convenience to distinguish the location of various components of the parts as they appear in the tool assembly 10. The directional terms are for illustrative purposes only, and are not intended to limit the scope of the appended claims.

The tool 12, which can be used for rotary face or end milling operations, has a tool axis A defining a front to back direction. The tool 12 has a tool body 29 provided with cutting inserts 30 on its periphery, a substantially cylindrical base 31 connected to the body 29, a hollow sleeve 32 formed proximate a front end of the tool and a tool cavity 34 formed proximate a rear end of the tool. The tool body 29 has a backwardly facing tool face 36 located at a back end of the tool 12 and a frontally facing body face 38. The sleeve 32, which has a substantially cylindrical internal surface, extends axially away from the body face 38 at a front end of the tool 12 to a frontally facing sleeve face 40 formed intermediate the body face 38 and the tool face 36. The tool cavity 34 opens out to the sleeve face 40 and tool face 36 and has a cylindrical shaped tool wall 42 coaxial with the tool axis A and having a tool diameter Dt. Thus, the tool cavity 34 communicates with the sleeve 32. The base 31 of the tool 12 has two identical key ways 44 which are distributed with 180° symmetry about the tool axis A.

Figure 3:
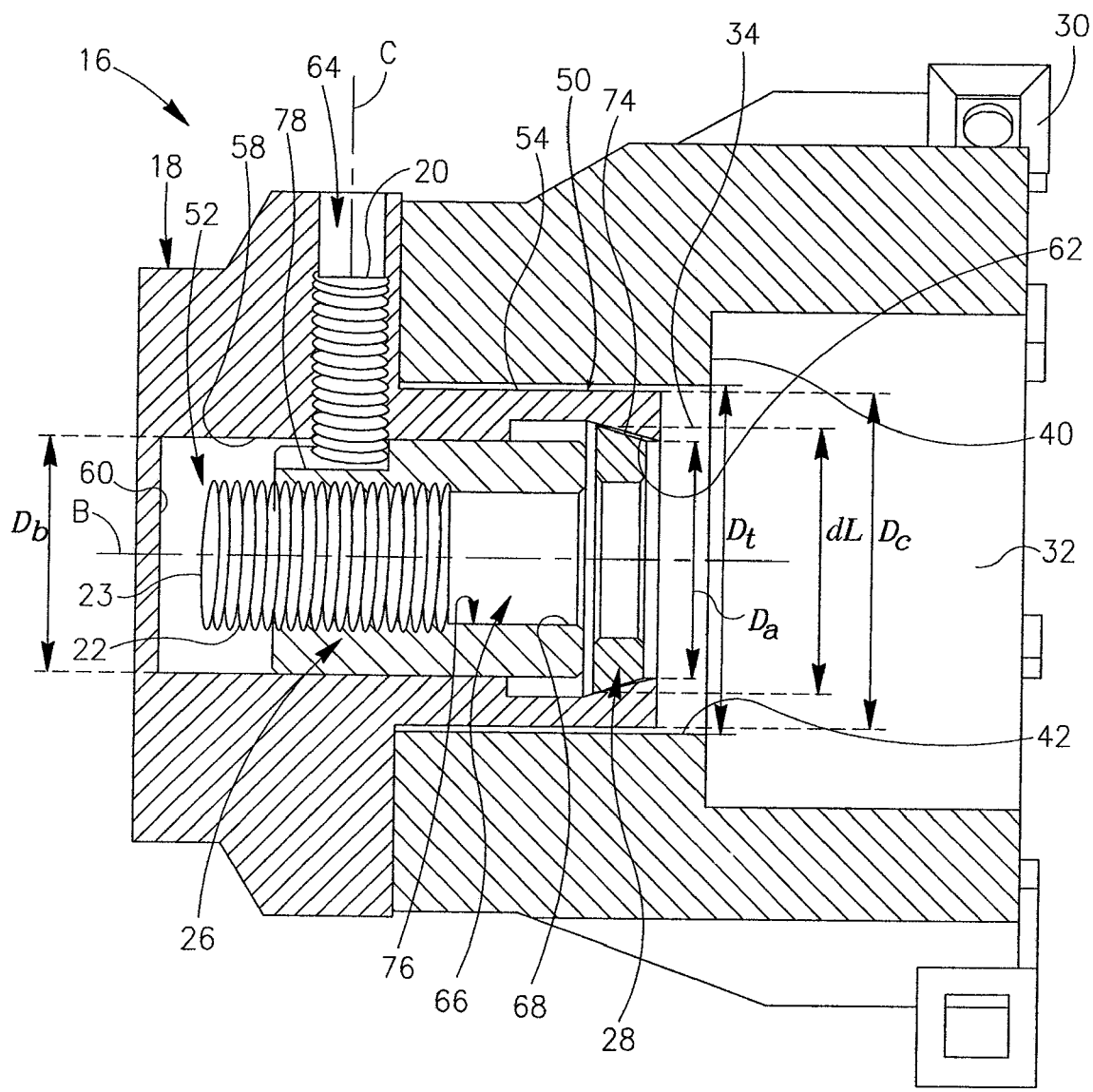
FIG. 3 is a partial cross sectional view of the tool holder taken in the plane III-III shown in FIG. 1.

Attention is now additionally drawn to FIG. 3. The holder body 18, anti-rotation screw 20, fastening screw 22 and sliding device 24 will each be described from hereon in its respective position in the tool holder 16 and in relation to a holder axis B of the tool holder 16. The holder axis B defines a forward to rear direction. The holder body 18 has a forwardly facing holder face 46, two identical drive keys 48, a shaft 50, a holder cavity 52 and a transversely directed threaded bore 64. The drive keys 48 are distributed with 180° symmetry about the holder axis B and in the tool assembly 10 are located within the key ways 44 of the tool 12 for transferring torque thereto.

The shaft 50 has a cylindrical peripheral shaft face 54 coaxial with the holder axis B and extending away from the holder face 46. The shaft face 54 has a shaft diameter Dc. The holder cavity 52 opens out to a forward end of the shaft 50 via an aperture 56 having an aperture diameter Da. The holder cavity 52 has an axially extending holder wall 58 and a forwardly facing rear surface 60 at a rear end thereof. A forward section of the holder wall 58 lies on a first tapering surface 62 which tapers forwardly to the aperture 56. The first tapering surface 62 forms a peripheral surface of an imaginary truncated cone. The threaded bore 64 has a longitudinal bore axis C which is perpendicular to the holder axis B, opens out to a peripheral surface of the holder body 18 adjacent the shaft 50 and communicates with the holder cavity 52.

The sliding device 24 extends along the holder axis B from a rear end thereof to a forward end thereof. The sliding device 24 has a device cavity 66. The device cavity 66 (See FIG. 3) has a device wall 68 which is coaxial with the holder axis B, extends through the flange 28 and bushing 26 and opens out to the forward and rear ends of the sliding device 24. The flange 28 has a peripheral surface which comprises two tapering sections 70 and two flat sections 72 (only one flat section 72 can be seen in FIG. 2). The tapering sections 70 are identical and are distributed with 180° symmetry about the holder axis B. Each flat section 72 is located circumferentially between the tapering sections 70 on opposing sides of the peripheral surface of the flange 28. The flat sections 72 are parallel to each other and are spaced apart by a first distance d1. The tapering sections 70 taper forwardly from a maximum diameter dL to the forward end of the sliding device 24 and lie on a second tapering surface 74 which forms a peripheral surface of an imaginary truncated cone.

The bushing 26 has a cylindrical peripheral surface having a bushing diameter Db and an internal thread 76 formed on a portion of the device wall 68 passing therethrough. A holding recess 78 formed on the peripheral surface of the bushing 26 opens out to the rear end of the sliding device 24. The bushing diameter Db is smaller than the aperture diameter Da so that the bushing 26 may be received in the holder cavity 52 via the aperture 56. However, the maximum diameter dL of the tapering sections 70 is larger than the aperture diameter Da. To accommodate the flange 28 in the holder cavity 52, the first distance d1 of the flange 28 is smaller than the aperture diameter Da so that the flange 28 may be received in the holder cavity 52 via the aperture 56 when the flange is oriented on its side in such a manner that its tapering sections 70 generally intersect the holder axis B and its flat sections 72 are generally parallel to the holder axis B.

Figure 4:
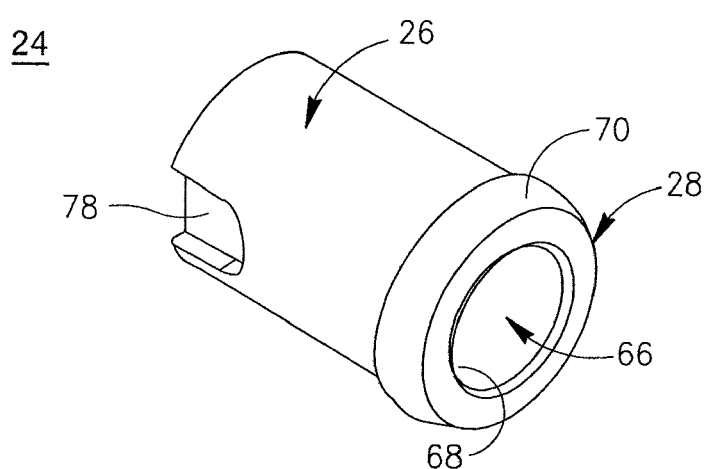
FIG. 4 is a perspective view of a one piece embodiment of a sliding device.

The sliding device 24, comprising the flange 28 and the bushing 26, may be formed as a single one-piece integral member, and therefore the tapering section 70 of the flange 28 may extend along its full peripheral circumference (FIG. 4). In such a case, the shaft 50 would have to be made of two separable portions separably joined at a join, so that the forward portion of the shaft can be separated from the rear portion of the shaft to enable the sliding device 24 to be positioned in the holder cavity 52.

The sliding device 24 is slidably retained in the holder cavity 52. Rotation of the bushing 26 in a given direction around the holder axis B is prevented in the tool holder 16 by the anti-rotation screw 20 which is threadingly engaged in the threaded bore 64 of the holder body 18 and protrudes into the holding recess 78 of the bushing 26. The fastening screw 22 has a cylindrical shape and is threadingly engaged in the internal thread 76 of the bushing 26.

Figure 5:
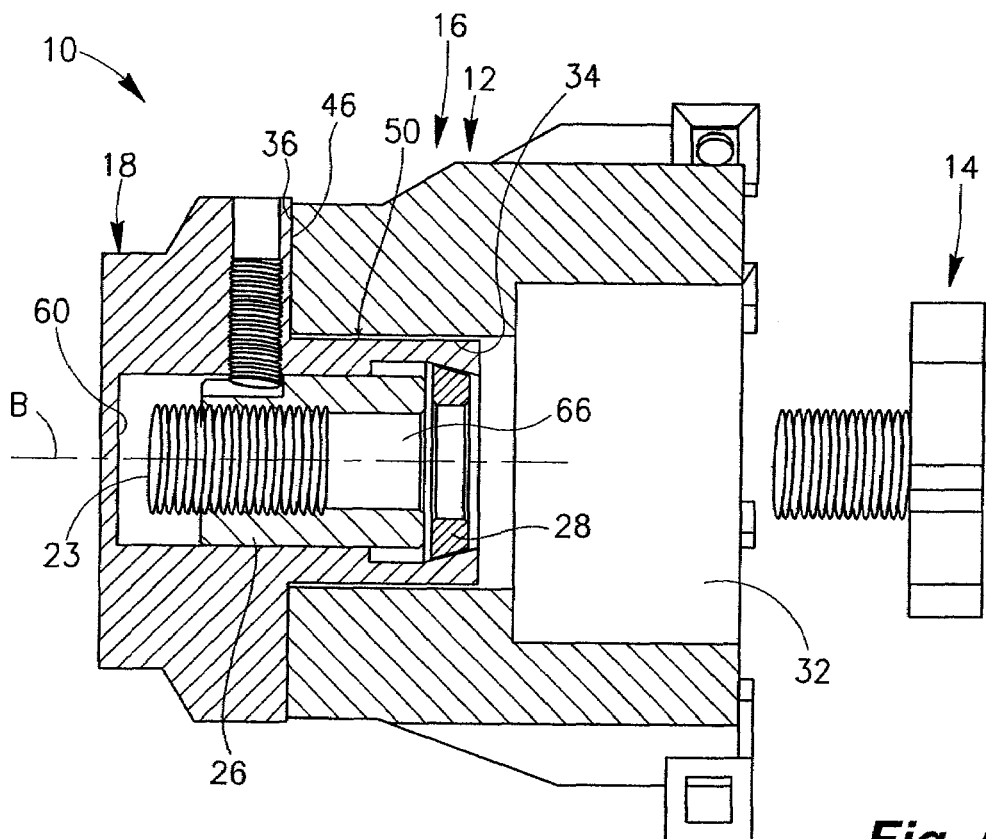
FIG. 5 is the partial cross sectional view shown in FIG. 3 with the tool placed on the tool holder and the clamping bolt removed.
Figure 6:
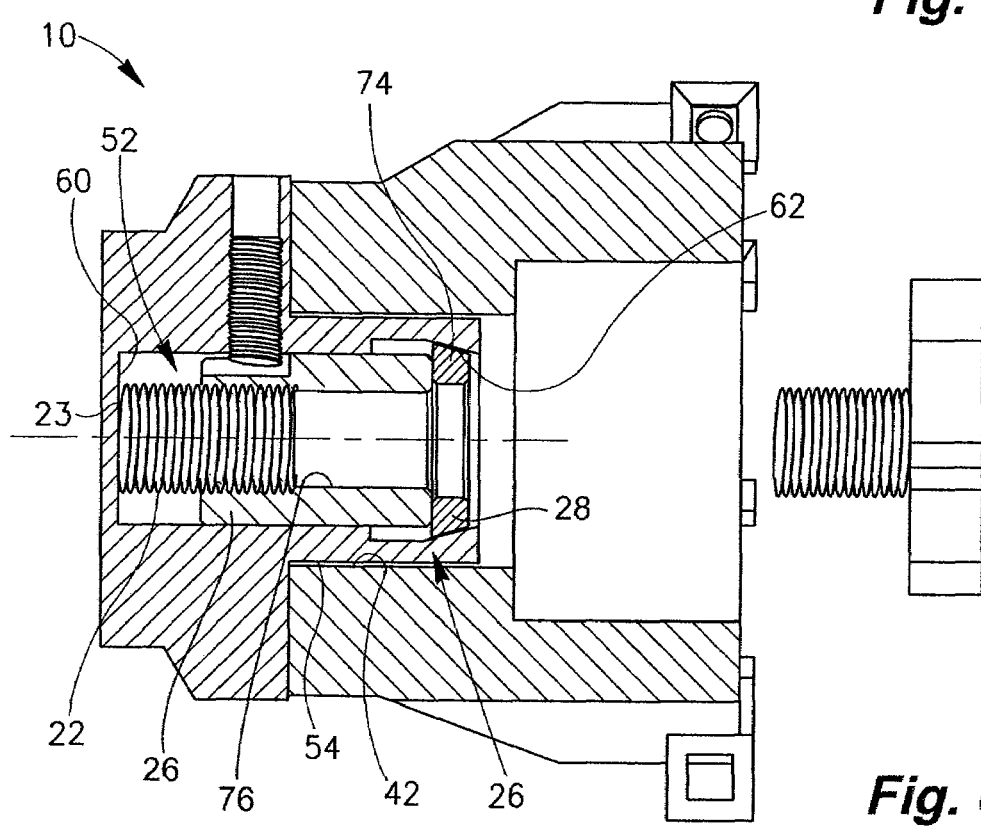
FIG. 6 is similar to FIG. 5 but with the sliding device in a forward position.
Figure 7:
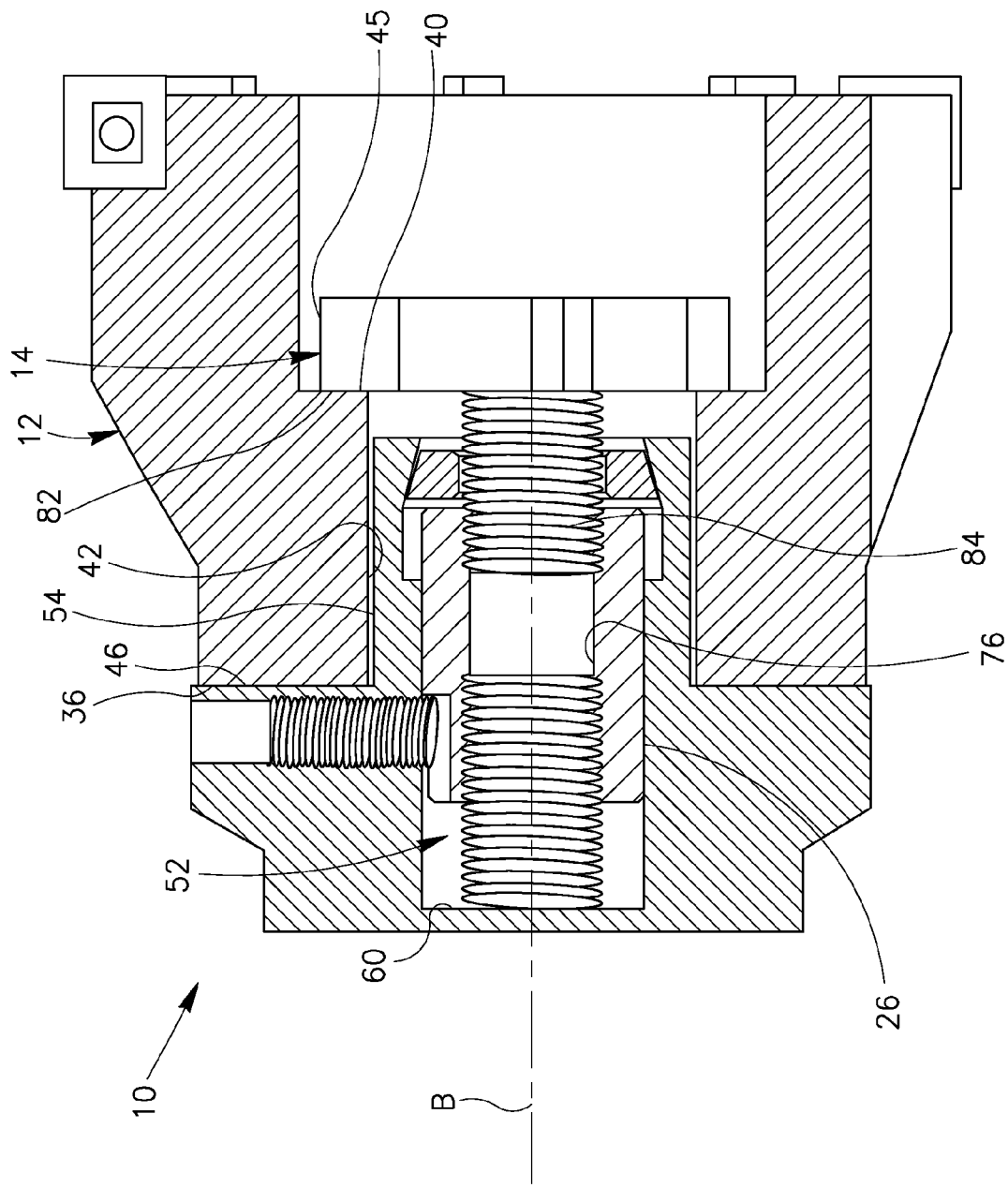
FIG. 7 is similar to FIG. 6 but with the clamping bolt threadingly engaged in an internal thread of the two piece sliding device.

Attention is now drawn to FIGS. 5 to 7 to show how the tool 12 is mounted on the tool holder 16. The tool 12 is first placed on the tool holder 16 in such a manner that the shaft 50 of the holder body 18 is located in the tool cavity 34, each drive key 48 is located in a respective key way 44 (not shown) and the tool face 36 faces the holder face 46 (FIG.

5). The tool diameter Dt is slightly larger than the shaft diameter Dc to form a clearance which enables the shaft 50 to easily slide into the tool cavity 34. This clearance may increase non-alignment in the tool assembly 10 between the tool axis A and the holder axis B and thereby increase the wear of the cutting means of the tool 12 and reduce surface quality of a workpiece being machined. The fastening screw 22, which is then screwed further into the internal thread 76 of the bushing 26, abuts the rear surface 60 of the holder cavity 52 with a rear end 23 thereof and then urges the sliding device 24 forwardly towards a forward position which brings the tool assembly 10 towards a locked position (FIG. 6). As a result, the tapering sections 70 of the flange 28 which lie on the second tapering surface 74 abut and bear against the forward portion of the holder cavity 52 which lies on the first tapering surface 62 and thereby cause the shaft 50 to elastically deform and symmetrically expand radially outwardly.

This symmetrical radial expansion will continue until, at least adjacent the tapering surfaces 62, 74, the clearance between the shaft face 54 and the tool wall 42 is eliminated and at least a portion of the shaft face 54 symmetrically abuts at least a portion of the tool wall 42. It should be noted that the symmetrical radial expansion of the shaft 50 helps center the tool 12 on the tool holder 16 and thereby increases alignment between the tool axis A and the holder axis B. The clamping bolt 14 has a cross shaped bolt head 45 (best seen in FIGS. 1 and 2) having a rearwardly facing clamping face 82 and a cylindrical threaded portion 84 extending away from the clamping face 82. The threaded portion 84 is finally screwed into the internal thread 76 of the bushing 26 until the clamping face 82 and the sleeve face 40 abut. By screwing the threaded portion 84 further into the internal thread 76, the tool 12 is urged rearwardly until the backwardly facing tool face 36 and the forwardly facing holder face 46 abut and then the sliding device 24 is urged further forwardly to the forward position thereby causing the shaft 50 to elastically deform and radially expand further more until the locked position of the tool assembly 10 is achieved (FIG. 7).

It will be appreciated that if the flange 28 shown in FIG. 2 is used (with the two flat section 72), then in the locked position the shaft 50 will be elliptical in shape, so that it will have 180° symmetry about the tool axis A, whereas if the flange 28 shown in FIG. 4 is used, then in the locked position the shaft 50 will be circular in shape, so that it will be completely symmetrical about the tool axis A.

There are situations in which it is not required to use the fastening screw 22 in addition to the clamping bolt 14. In these situations, the clamping bolt 14 will both urge the sliding device 24 forwardly to radially expand the shaft 50 until its shaft face 54 symmetrically abuts the tool wall 42, and urge the tool 12 rearwardly until the tool face 36 and holder face 46 abut.

Although the present invention has been described to a certain degree of particularity, it should be understood that various alterations and modifications could be made without departing from the scope of the invention as hereinafter claimed.

What is claimed is:

1. A tool assembly comprising:
    a tool holder having a holder axis, and comprising:
        a holder body, the holder body comprising a shaft at a forward end thereof and a holder cavity, the shaft having a peripheral shaft face coaxial with the holder axis, the holder cavity having a holder wall coaxial with the holder axis, at least one section of the holder wall comprising a first forwardly tapering surface; and
        a sliding device having forward end and a rear end, and at least one peripheral section of the sliding device comprising a second forwardly tapering surface; and
    a cutting tool having a tool axis defining a front to back direction and comprising:
        a tool cavity having a tool wall coaxial with the tool axis;
    wherein:
    the tool assembly is adjustable between:
        an unassembled position in which:
            the tool holder and cutting tool are separated from one another; and
        a locked position in which:
            the cutting tool is removably secured to a forward end of the tool holder;
            the sliding device is releasably retained in the holder body with the first forwardly tapering surface abutting the second forwardly facing surface;
            at least a portion of the shaft face abuts at least a portion of the tool wall; and
            the shaft is deformed and expanded radially outwardly.

2. The tool assembly according to claim 1, wherein:
    the sliding device comprises a flange and a bushing;
    the second forwardly tapering surface is associated with the flange; and
    the bushing is provided with an internal thread.

3. The tool assembly according to claim 2, wherein:
    the holder cavity opens out to a forward end of the shaft via an aperture having an aperture diameter Da;
    the flange has a maximum diameter dL, with dL>Da; and
    in the locked position:
        the flange is retained in the holder cavity with the first forwardly tapering surface of the holder wall being in abutment with the second forwardly tapering surface of the flange.

4. The tool assembly according to claim 2, wherein:
    the flange and the bushing are separate members.

5. The tool assembly according to claim 2, wherein:
    the flange and the bushing form an integral one-piece member.

6. The tool assembly according to claim 1, further comprising:
    a clamping bolt having a clamping face and a threaded portion extending away from the clamping face;
    and wherein:
    the sliding device comprises a device cavity having a device wall, at least a portion of the device wall forming an internal thread;
    the cutting tool comprises an axially oriented sleeve extending to a frontally facing sleeve face; and
    in the locked position:
        the device wall is coaxial with the holder axis;
        the threaded portion of the clamping bolt is threadingly engaged in the internal thread; and
        the clamping face of the clamping bolt abuts the sleeve face of the cutting tool.

7. The tool assembly according to claim 6, wherein:
    the tool holder comprises a fastening screw threadingly engaged in the internal thread;
    the holder cavity has a rear surface at a rear end thereof, and
    in the locked position:

a rear end of the fastening screw abuts the rear surface of the holder cavity.

8. The tool assembly according to claim 6, wherein:
the device cavity opens out to the forward and rear ends of the sliding device.

9. The tool assembly according to claim 1, wherein:
the cutting tool has a backwardly facing tool face and an axially oriented sleeve extending to a frontally facing sleeve face, the sleeve extending in a direction away from the backwardly facing tool face;
the tool holder has a forwardly facing holder face and the tool holder's shaft extends forwardly and away from the holder face; and
in the locked position:
the backwardly facing tool face at least partially abuts the forwardly facing holder face.

10. The tool assembly according to claim 1, wherein:
the shaft face and tool wall each lie on a peripheral surface of a cylinder; and
the first and second tapering surfaces each lie on a peripheral surface of a truncated cone.

11. The tool assembly according to claim 1, wherein:
the cutting tool has an axially oriented sleeve extending to a frontally facing sleeve face;
the holder cavity opens out to the forward end of the holder body; and
the tool cavity opens out to the frontally facing sleeve face and a backwardly facing tool face.

12. The tool assembly according to claim 1, wherein:
said at least a portion of the shaft face symmetrically abuts said at least a portion of the tool wall.

13. A method for assembling a tool assembly comprising the steps of:
providing a tool holder having a holder axis, and comprising:
a holder body, the holder body comprising a shaft at a forward end thereof and a holder cavity, the shaft having a peripheral shaft face coaxial with the holder axis, the holder cavity having a holder wall coaxial with the holder axis, at least one section of the holder wall comprising a first forwardly tapering surface; and
a sliding device having forward end and a rear end, and at least one peripheral section of the sliding device comprising a second forwardly tapering surface; and
providing a cutting tool having a tool axis defining a front to back direction and comprising:
a tool cavity having a tool wall coaxial with the tool axis;
inserting the sliding device into the holder cavity;
inserting the shaft of the tool holder into the tool cavity of the tool; and
urging the sliding device forwardly so that the first tapering surface bears against the second tapering surface and deforms the shaft face outwardly until at least a portion of the shaft face abuts the tool wall.

14. The method according to claim 13, comprising:
turning a clamping bolt having a threaded portion engaged to an internal thread formed in a device wall of the sliding device, to thereby urge the sliding device forwardly.

* * * * *